UNITED STATES PATENT OFFICE.

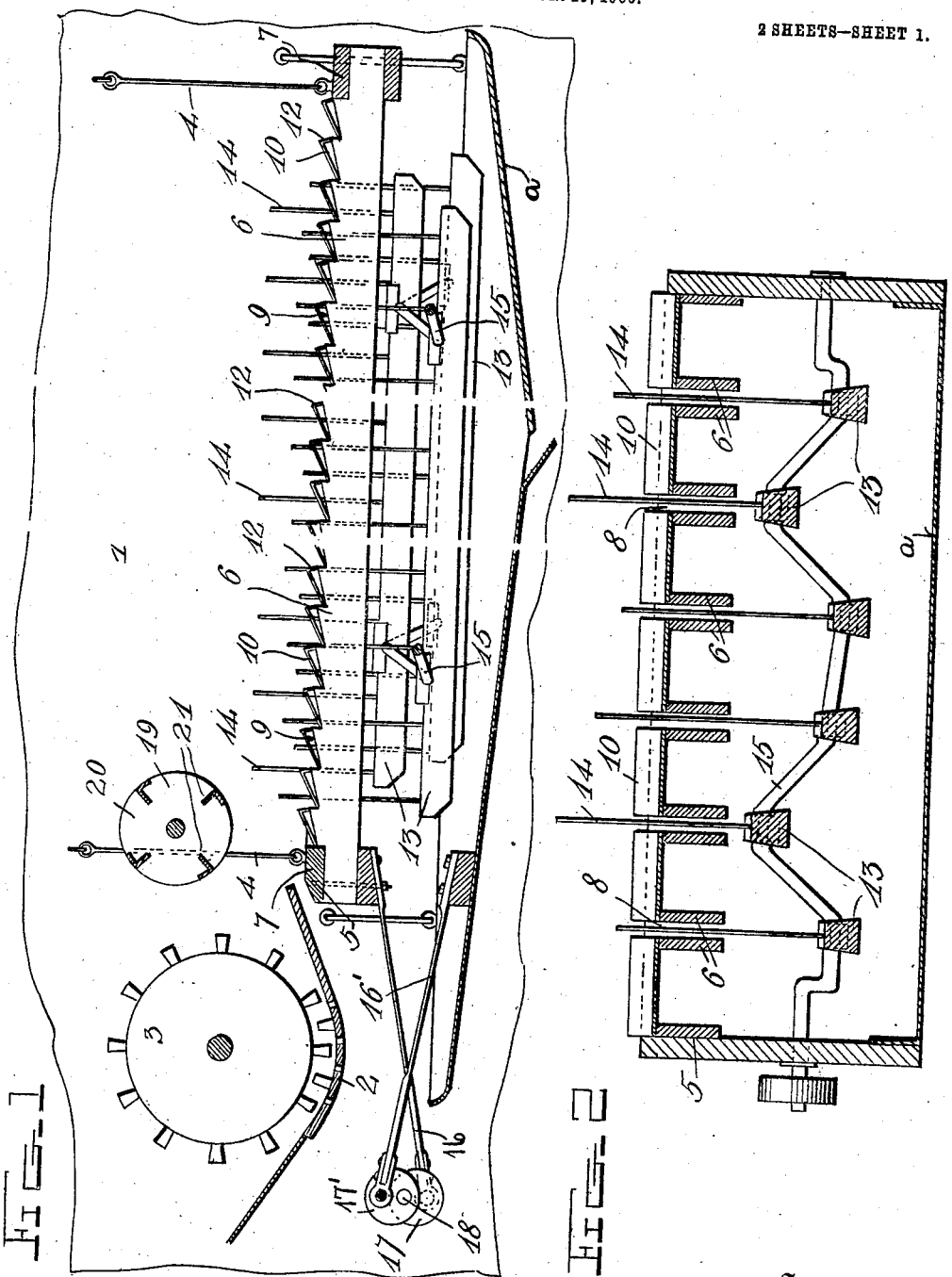

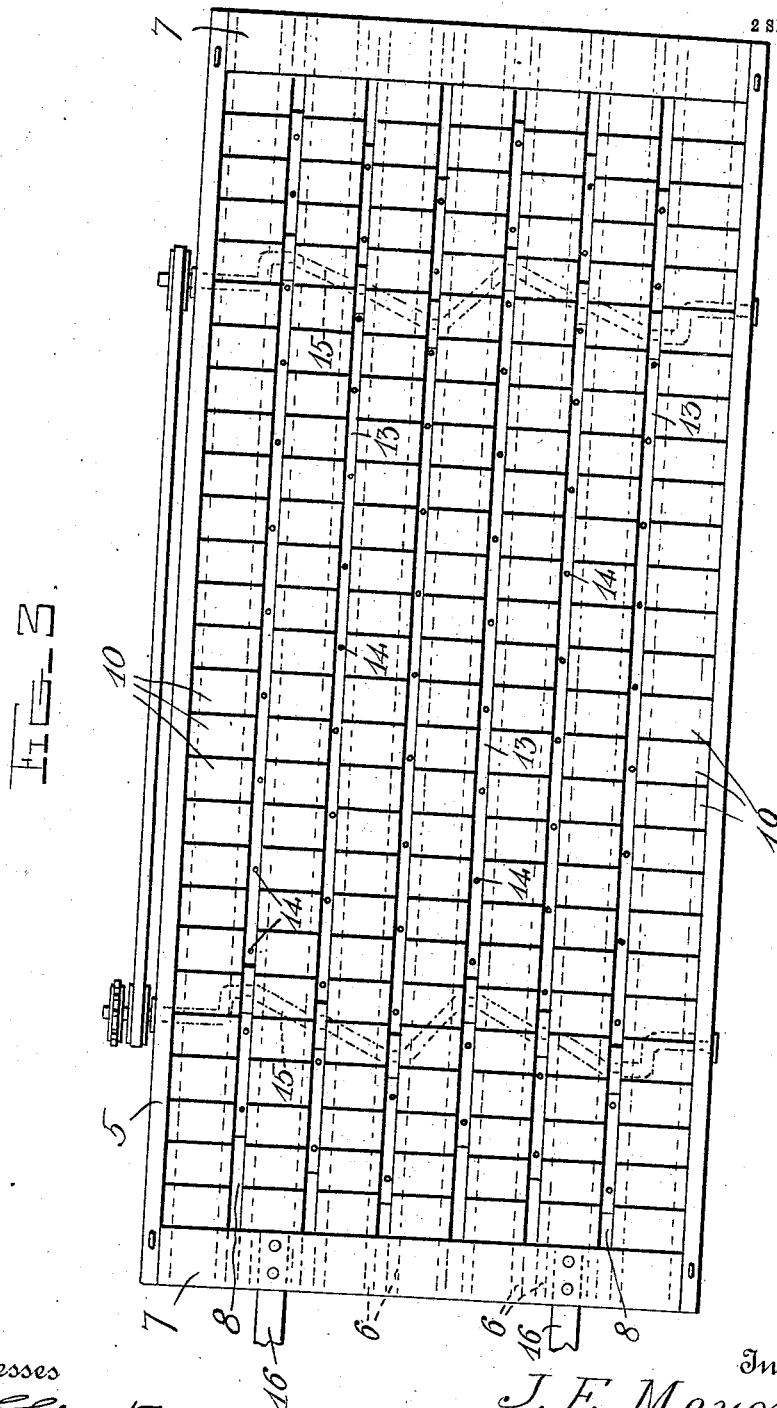

JOHN EDWARD MEYER, OF SHEPHERD, MICHIGAN, ASSIGNOR OF ONE-TENTH TO BERT G. FREEMAN, OF SHEPHERD, MICHIGAN.

GRAIN-SEPARATOR.

No. 848,670.

Specification of Letters Patent.

Patented April 2, 1907.

Application filed April 19, 1906. Serial No. 312,605.

*To all whom it may concern:*

Be it known that I, JOHN EDWARD MEYER, a citizen of the United States, residing at Shepherd, in the county of Isabella and State of Michigan, have invented certain new and useful Improvements in Grain-Separators; and I do declare the following to be a full, clear, and exact description of the invention, such as will enable others skilled in the art to which it appertains to make and use the same.

This invention relates to improvements in grain-separators.

The object of the invention is to provide a grain-separator having means whereby practically all the threshed grain is separated from the straw and dropped to the grain-pan.

Another object of the invention is to provide a machine of this character having a simple and efficient arrangement of straw racks and pickers and means to operate the same, whereby the straw in passing over the racks will be pulled apart and thoroughly shaken.

A further object is to provide an improved construction of beater, to be used in connection with the straw-racks, whereby the unthreshed grain will be knocked from the straw, the construction of the beater being such that the rapid revolution of the same will not create an air-blast, so that the straw from the cylinder will be allowed to closely hug the bars of the beater.

With the above and other objects in view, the invention consists of certain novel features of construction, combination, and arrangement of parts as will be hereinafter described and claimed.

In the accompanying drawings, Figure 1 is a vertical longitudinal sectional view through a portion of the separator, showing the application of the invention. Fig. 2 is a vertical cross-sectional view of the same, and Fig. 3 is a plan view of the straw racks and pickers.

Referring more particularly to the drawings, 1 denotes the separator-frame, in the front end of which is arranged the usual concave 2 and threshing-cylinder 3. Suitably supported upon hangers 4 is a straw-rack frame 5. In the upper side of the frame 5 is arranged a series of longitudinally-disposed supporting-bars 6, which are connected at their opposite ends by cross-bars 7. The longitudinal bars 6 are arranged in pairs, as shown, each pair of bars being separated from the next adjacent pair, forming a series of longitudinally-disposed passages 8. The bars 6 of each pair are notched or stepped on their upper edges to form alined offset surfaces 9. Arranged on the offset surfaces 9 of each pair of bars 6 are short metal plates 10, which have formed on one edge right-angular downwardly-projecting flanges 12, which engage the offset surfaces 9 of the bars 6, as shown. The plates 10 are arranged in alinement across the rack and form a fish-back construction, as shown.

Arranged below the bars 6 of the rack is a series of longitudinally-disposed picker-bars 13, said bars being provided with upwardly-projecting picker rods or fingers 14, adapted to work through the passages 8, formed between the longitudinal bars of the rack, as shown. The bars 13 are mounted at each end upon triple crank-shafts 15, which are journaled in the sides of the separator and are operated by any suitable driving mechanism whereby an upward and rearward movement is imparted to the picker bars and rods, thereby causing said rods to thoroughly separate and shake the straw upon the racks, thus separating therefrom all grain which may have passed from the concave onto the racks with the straw.

The straw is forced toward the rear of the machine by the shaking motion of the straw-rack, imparted thereto by a crank 17 on a shaft 18 and a pitman 16, which connects the straw-rack and the said crank. Said shaft is journaled in suitable bearings at the front end of the separator-frame and may be driven by any suitable means such as are usually employed in machines of this class.

The grain-pan *a* is suitably mounted and supported for longitudinal movement independently of the straw-rack and is driven by a crank 17' on the shaft 18, disposed oppositely with reference to the crank 17 and a pitman 16'. It will be understood from an inspection of Fig. 1 of the drawings that the straw-rack and grain-pan are driven simultaneously in reverse directions.

Revolubly mounted in the separator-frame immediately in rear of the threshing-cylinder and above the inner end of the straw-rack is a beater 19, said beater being preferably formed of two cylindrical heads 20, connected by a series of longitudinally-disposed angle-iron beater-bars 21, of which there may be any suitable number, four of the same being shown in the drawings as the preferred number, said bars being arranged at diametrically opposite points on the heads 20. By providing the beater-bars as shown and described the straw will not be blown or fanned by the rapid revolution of the beater, thus permitting the straw to closely hug the upper surface of the straw-racks, in which position it is more readily acted on by the picker-rods.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a separator of the character described, the combination with the threshing mechanism, of a straw-rack loosely mounted therein, said straw-rack comprising a series of longitudinally-disposed bars connected at their opposite ends by cross-bars, said longitudinal bars being arranged in pairs to form passages between each pair of bars, fish-back notches or offsets formed on the upper edges of said longitudinal bars, fish-back plates secured to said offset surfaces of each pair of bars, said plates having right-angularly formed flanges, whereby the former are supported in an inclined position on said offset surfaces, a series of picker-rods arranged below said rack-bars, picker-rods secured to said bars and projected upwardly therefrom through the passages between said straw-rack bars, means to impart upward and rearward movement to said picker bars and rods, means to shake said straw-rack, and a beater mounted above the forward end of said straw-rack, substantially as described.

2. In a separator, the combination with the threshing mechanism, of a fish-back straw-rack loosely mounted therein, said rack being provided with a series of longitudinally-disposed passages, triple crank-shafts arranged below said rack, a series of picker-bars mounted on said crank-shaft, upwardly-projecting picker-rods arranged on said bars to project upwardly through the passages in said straw-rack, whereby when said crank-shafts are operated an upward and rearward motion will be imparted to said picker bars and rods, a grain-pan, pitman-rods connected to said straw-rack and grain-pan, respectively, a drive-shaft, oppositely-disposed cranks mounted on said shaft and connected to said pitman-rods, whereby said straw-rack and grain-pan are shaken, a beater revolubly mounted above the forward end of said straw-rack, and plates in said beater to prevent the fanning or blowing of the straw from the threshing mechanism, substantially as described.

In testimony whereof I have hereunto set my hand in presence of two subscribing witnesses.

JOHN EDWARD MEYER.

Witnesses:
R. D. MATTHEWS,
HOMER LYON.